United States Patent Office 2,765,892
Patented Oct. 9, 1956

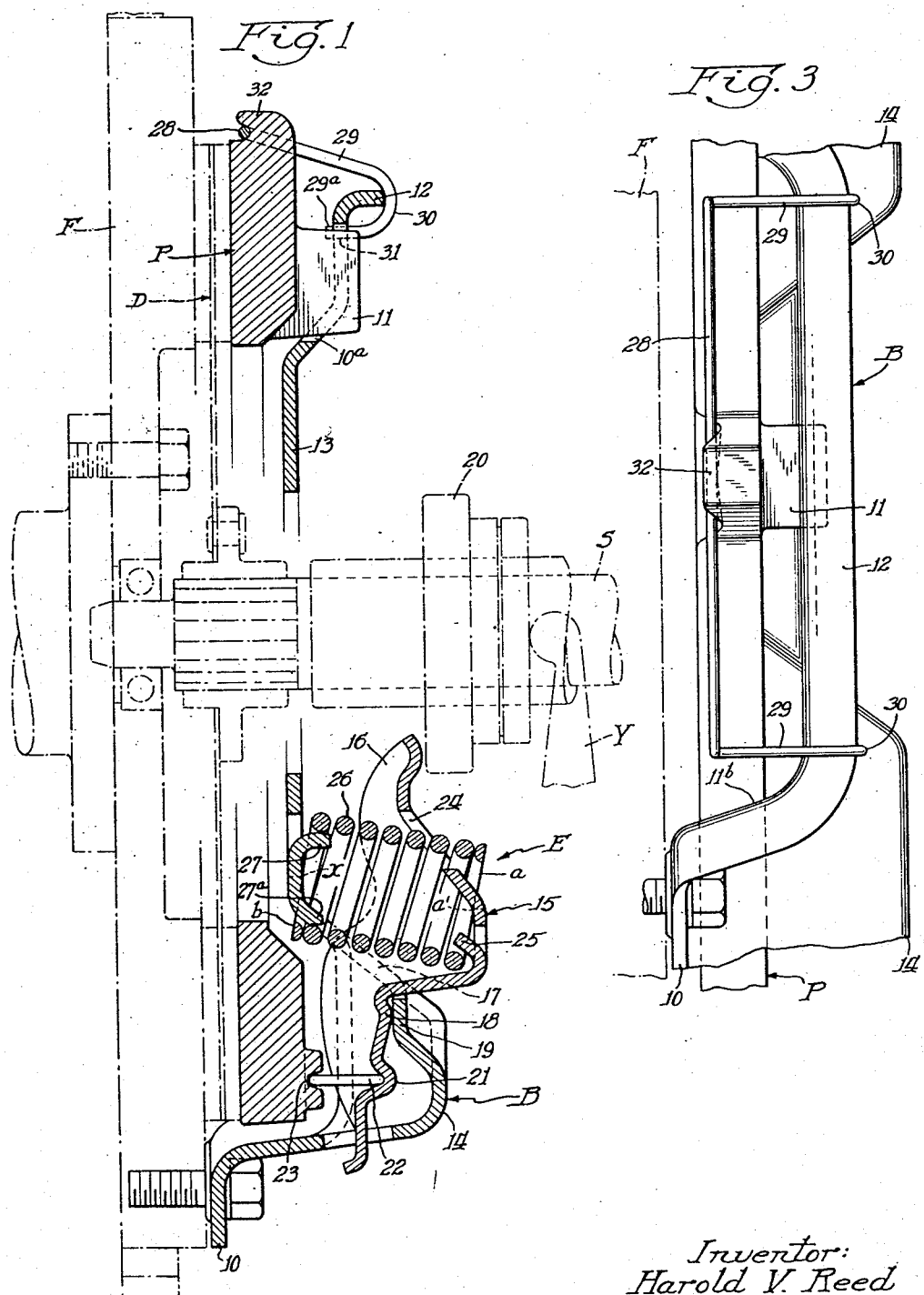

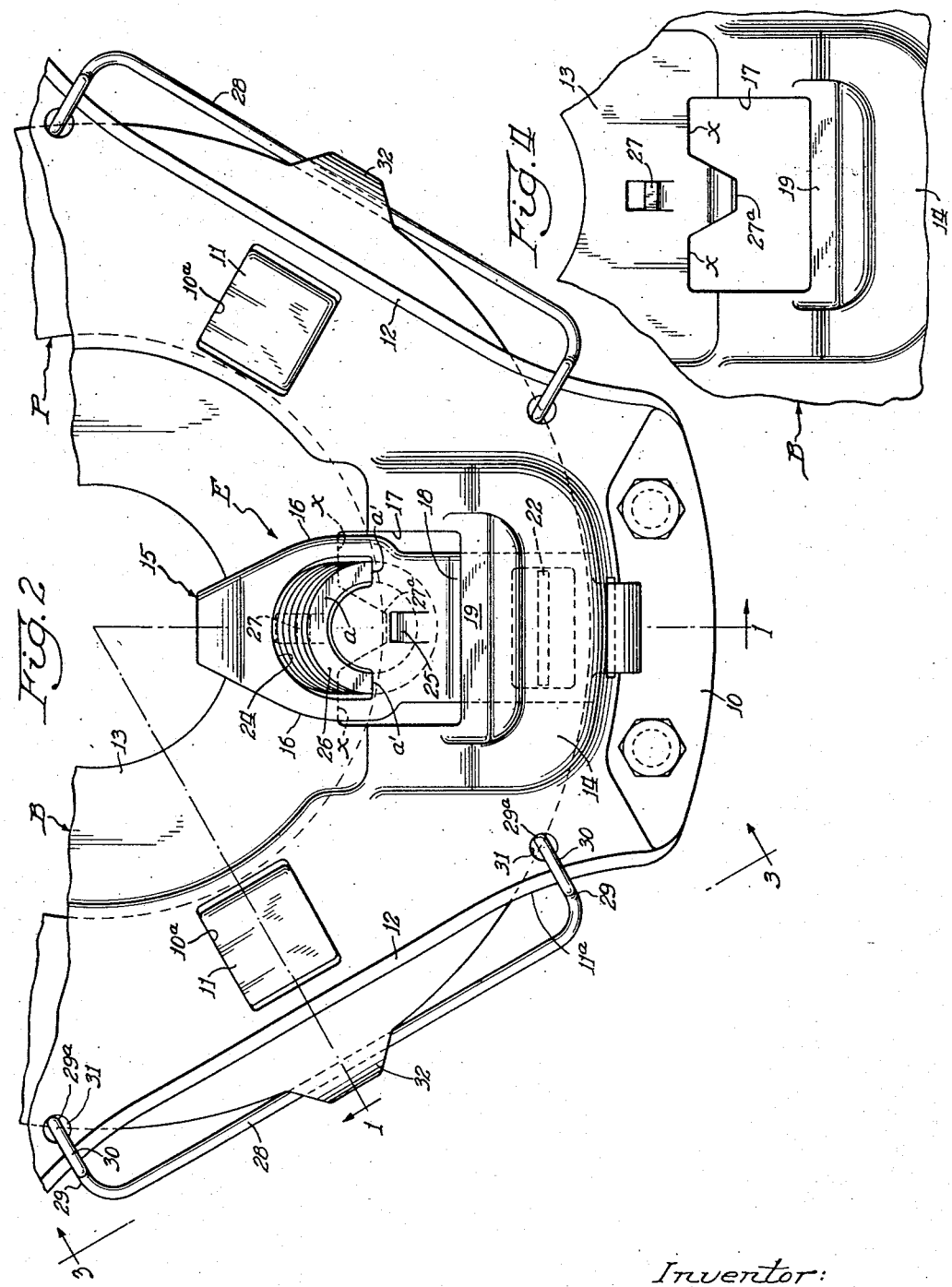

2,765,892

FRICTION CLUTCH ASSEMBLY

Harold V. Reed, Chicago, Ill., assignor to Borg-Warner Corporation, Chicago, Ill., a corporation of Illinois Application October 11, 1952, Serial No. 314,323

16 Claims. (Cl. 192—99)

The present invention relates to clutches and more particularly to friction clutches such as those installed in motor driven vehicles.

An object of this invention is to provide an improved friction clutch assembly wherein the engagement of the clutch members is accomplished by novel means. To carry out this function the clutch pressure plate is shifted toward the flywheel by spring means acting between the clutch release levers and a supporting structure therefor which is carried by the flywheel. As shown herein the levers exert the packing force against the pressure plate and the springs are fulcrumed on chisel edges or line contacts at their end coils to reduce friction during movements of the levers.

A further object of this invention resides in providing novel means in the above described clutch assembly for insuring positive withdrawal of the pressure plate from the driven friction disc after the packing pressure of the clutch levers has been released. The means contemplated to carry out this function preferably comprises an elongate spring member the ends of which are mounted on the back member or cover with its intermediate portion releasably engaged with a suitable portion of the pressure plate.

Another object of the present improvements is to provide a friction clutch structure wherein there is a reduction of the axial dimensions as compared with those of the commercial assemblies in motor vehicles. Notwithstanding the compactness of the present structure, the parts thereof are more readily accessible for replacement, repair and adjustment than in the prior assemblies, and friction between related parts is reduced to a minimum. Also friction between the cover and the release levers fulcrumed thereon is eliminated by providing convex fulcrum ribs on the levers to roll on adjacent surfaces of the cover.

Additional objects, aims and advantages of the improvements contemplated herein will be apparent to persons skilled in the art after the construction and operation of this friction clutch assembly is understood from the within description. Reference is now made to the drawings forming a part of the specification.

In the drawings:

Fig. 1 is a radial axial section through a friction clutch assembly such as contemplated herein, the view being taken along the plane of line 1—1 on Fig. 2;

Fig. 2 is a vertical elevation of the present clutch assembly looking at the back or rear thereof;

Fig. 3 is a side view looking at the structure from the plane of line 3—3 on Fig. 2;

Fig. 4 is a fragmentary view showing details of the spring seating aperture in the lever supporting member.

The drawings are to be understood as being more or less of a diagrammatic character for the purpose of disclosing a typical or preferred form of the improvements in friction clutch assemblies contemplated herein, and in these drawings like reference characters identify the same parts in the different views.

The clutch structure which is herein disclosed comprises generally a rotatable flywheel F; a pressure plate P; a bracket member or support B attached to and rotated by the flywheel; and a driven friction plate D which is adapted to be packed between the flywheel F and the pressure plate P by novel force exerting means defined by the assembly E which acts between said pressure plate and said bracket or support B. As will be seen this force exerting assembly E is carried by the bracket or support B and includes suitable lever means fulcrumed on the member B and urged to clutch engaging position by a spring. In the assembly shown the force exerting means has its major portion arranged rearward of and exterior to the support B for ready access thereto. By reason of the foregoing arrangement the present clutch assembly is characterized by its extreme compactness—that is, the overall axial dimensions thereof is materially less than the axial dimensions of a majority of the clutches currently installed in motor vehicles.

The flywheel F is secured to the usual engine crank shaft (not shown) for rotation therewith, and it has the support B anchored to its periphery by bolts which are turned through circumferentially extending flange portions 10 of the support. The pressure plate P has axially extending lugs 11 which project through adjacent openings 10a in the support thereby providing a driving connection between the flywheel and the pressure plate for conjoint rotation. As shown in Fig. 2, the bracket or supporting structure B may have an approximately triangular contour with the flanges 10 at the apices of the triangle, and the edge portions 11a of the support between these flanges 10 recede inwardly in a concave curve and are arched in a direction away from the flywheel as indicated at 11b (see Fig. 3). This bracket structure may be so formed that it provides a housing for the elements of the clutch assembly. The margins of the arched or concave portions have axially extending lips 12 projecting in a rearward direction from the adjacent body of the support as shown.

The support B is preferably a sheet metal stamping in which there is a depressed central portion 13 defining a radial back member or plate, and it also has a plurality of suitably shaped embossments 14 which are located radially inward from the flanges 10 and project rearward of the plane of the back plate portion 13. These embossments provide means for receiving and supporting elements of the force exerting means which effect engagement of the clutch members as will later be described.

The force exerting assembly E comprises a plurality of levers and springs, preferably three in number. For the purpose of simplicity, one assembly E will be described in detail. The lever 15 is preferably a metal stamping of generally U-shaped in cross section to provide parallel side wall flanges 16 extending longitudinally of the lever as shown in Fig. 1. This lever 15 extends through a suitably shaped opening 17 in a sloping or oblique side wall of the embossment 14. The radially outer region or foot portion of the lever 15, which is within the embossment 14, has a fulcrum rib 18 of convex rounded contour that rolls on against the inner radial surface of an irregularly shaped tongue 19 projecting inwardly from the radially outer wall of the embossment 14. This arrangement permits the lever 15 to roll without friction at its fulcrum rib 18 when its radially inner end is moved by a release collar 20 that slides on the driven shaft S.

The foot portion of the lever, which extends radially outward from the fulcrum 18, is formed with a concave seat 21 to receive the adjacent edge of the strut 22, and the opposite edge of said strut is engaged in a recess 23 in the adjacent rear face of the pressure plate P. This strut arrangement adapts the lever to the rolling action effected by convex fulcrum rib 18. It should be noted that the side flanges 16 of the lever are adjacent the radial side walls of the opening 17 in the embossment 14 through which the lever extends, and thus providing guiding means for the lever which tend to prevent sidewise displacement thereof.

There is an arcuate aperture 24 in the radially inner or main body portion of the lever 15, and radially outward from this aperture the lever has an inwardly projecting tongue 25 pointing forwardly toward the pressure plate. A coiled expansion spring 26 has portions of its convolutions seated in the arcuate aperture 24 in the manner as shown in Fig. 1 where it will be seen that these convolutions also surround the tongue 25. Thus the clutch packing spring 26 is definitely retained in position on the lever 15. At the other end of the spring the convolutions project into the opening 17 in the embossment 14, and radially inward from said opening there is an outwardly and rearwardly extending tongue 27 in the back plate portion 13 of the support. As shown in Figs. 1 and 4, there is a lip 27a projecting from an edge x of opening 17 in the back plate. The tongue 27 and lip 27a are surrounded by the adjacent end convolutions of the spring 26 and also further assist in preventing displacement of the force exerting spring which may be due to centrifugal action or vibration during rotation of the clutch. Furthermore, this arrangement has the characteristic that it affords ready access to the clutch operating assembly E at any time it may be desirable to replace the lever or the spring, or make adjustments.

Paricular attention is directed to the fact that the terminal convolutions of spring 26 are ground flat as indicated at a and b respectively, and these flat surfaces are in parallel planes as will be seen in Fig. 1. The flat surface a of the spring fulcrums on the angular edge portion a' of the arcuate aperture 24 in the lever body portion. At the opposite end of the spring the flat surface b fulcrums on the angular edge portions x, x of the opening 17 at the sides of lip 27a. It is apparent these fulcrums a' and x provide knife edges or line contacts for the terminal convolutions of the spring and thus reduce friction between the spring and its mounting means to a minimum.

The force exerting assembly E as above described is quite effective to maintain the pressure plate P, the friction disc D and the flywheel F in intimate contact during engagement of the clutch. A suitably operated actuator yoke Y is movable towards the clutch assembly to shift the collar 20 into contact with the radially inner ends of the levers 15 thereby to ease the tension of the spring 26 so that the foot portion of the lever is moved away from the pressure plate to relieve the latter of the force exerted by the packing spring and thereby permit the pressure plate to shift rearward for the flywheel F releasing the clutch.

In order to insure positive breakaway of the pressure plate P from the friction disc D when the clutch has been released by the yoke Y, means are provided for withdrawing the pressure plate in an axially rearward direction. For the purpose of accomplishing this function suitable retractor means are incorporated in the assembly which may take the form of an elongated spring rod 28 having lateral fingers 29 at its ends to define a U-shape element. The free ends of the fingers 29 are arcuately and reversely bent as at 30 so that they extend around the rim portion 12 of the bracket as clearly shown in Fig. 1. The forwardly extending terminals 29a of the fingers are inserted through small holes 31 in the support. The intermediate region of the retractor rod 28 is engaged with hook-shaped lugs 32 preferably on the outer periphery of the pressure plate in the manner shown in Figs. 1 and 2. The arrangement of this retractor device is such that its intermediate region 28 permits it to be readily engaged by a snap action with the hooklike lugs 32 on the pressure plate, and this arrangement also allows for the ready disengagement of the device from the pressure plate by simple means such as a screw driver or similar tool inserted between the mid region of rod 28 and the outer circumferential edge of the pressure plate to pry the rod loose of the hook lugs 32, as will be understood.

While this invention has been described in detail in its present preferred form or embodiment, it will be apparent to persons skilled in the art, after understanding the construction, operation and functions of the improvements, that various changes and modifications may be made therein without departing from the spirit and scope thereof. It is aimed in the appended claims to cover all such changes and modifications.

What is claimed is:

1. A clutch comprising drive and driven members adapted for frictional engagement; a pressure plate rotatable with said drive member and movable axially to frictionally engage said members; a back member rotatable with said drive member; and means applying pressure to said pressure plate to axially shift the same in a direction to frictionally engage said drive and driven members, said means comprising a radial lever having a body region positioned rearward of said back member, and having a foot region forward of said back member for axially moving said pressure plate into clutch engaging position; means fulcruming said lever on said back member; a lug on the lever body region extending toward said back member, said lever having an opening adjacent said lug; a lug on said back member extending toward said lever; and a coiled spring seated at its opposite ends around said lugs with its end convolutions nearest said lever positioned in said lever opening for retaining said spring.

2. A clutch comprising drive and driven members adapted for frictional engagement; a driven pressure plate movable axially to effect said frictional engagement of said members; a clutch housing carried by said drive member and drivingly connected with said pressure plate; and packing means for axially moving said pressure plate toward said members to engage the clutch, said means comprising a radially positioned lever the body region of which is positioned back of said housing and the foot region of which is within said housing to act on said pressure plate; fulcrum means for mounting said lever on said housing intermediate said body and foot regions; said lever having an arcuate opening in said body region; lugs extending toward each other on said housing and said lever; and a coiled spring seated at its ends on said housing and lever in surrounding relation to the respective lugs, the terminal region of said spring nearest said lever being extended through said arcuate opening to retain said spring in position.

3. A clutch comprising driving and driven members; an axially shiftable pressure plate cooperating with said members; releasable means applying axial force on said pressure plate to effect engagement of said members; a back plate rearward of said pressure plate; and a circumferentially extending elongate element having means at its ends which are separately connected to circumferentially spaced regions of said back plate, said element having a yieldable intermediate region arranged on a chordal line with respect to said back plate and detachably latched to said pressure plate for withdrawing said pressure plate from said driving and driven members upon release of said force applying means, said intermediate region and said means of said element being connected by portions of said element extending beyond and overlying the radially outer edge of said back plate.

4. In a clutch, driving and driven members adapted for frictional engagement; an annular pressure plate movable axially for effecting engagement of said members; annular lever supporting means attached to said driving member and positioned rearward of said pressure plate; levers fulcrumed on said supporting means and acting on said pressure plate to axially shift said pressure plate; unitary spring means engaged directly with said supporting means and extending beyond and overlying the radially outer edge of said supporting means and latchably engaged with said pressure plate for permitting said axial shift of the pressure plate and to retract said pressure plate upon clutch release; and clutch engaging packing means between and carried solely by said supporting means and said levers, said packing means operating directly against said levers to urge said pressure plate in a direction to effect engagement of said driven member between said driving member and said pressure plate.

5. In a clutch, driving and driven members adapted for frictional engagement; an annular pressure plate movable axially for effecting engagement of said members; an annular back plate attached to said driving member with a region rearward of said pressure plate; a lever fulcrumed on said back plate and acting on said pressure plate in a direction to axially shift said pressure plate; unitary spring means having portions extending beyond and overlying the radially outer edge of said back plate, and other portions connected respectively to said back plate and detachably engaged with said pressure plate for permitting said axial shift of the pressure plate; and clutch engaging packing means between and carried solely by said back plate and said lever for and acting directly on said lever to urge the lever in a direction to move said pressure plate towards said driven member to effect engagement thereof between said driving member and said pressure plate.

6. A clutch comprising driving and driven members adapted to be frictionally engaged; a pressure plate movable axially for effecting said frictional engagement of said members; a clutch cover drivingly connected to said pressure plate and anchored to said driving member for housing said driven member and pressure plate; outturned lugs on a radial wall of said cover and openings in the cover radially outward from said lugs; radial levers extending into said cover through said cover openings and each fulcrumed at an edge of the opening, the radially outer portions of said levers exerting force against said pressure plate to effect engagement of the driving and driven members; inturned lugs on body portions of said levers and apertures radially inward of said inturned lugs; coiled springs packed between said cover and said lever body portions for urging said levers in a direction to effect clutch engagement; the terminal portions of said springs surrounding said cover lugs and lever lugs and positioned in the respective openings and apertures in said cover and levers, and means connecting said cover and pressure plate for withdrawing said pressure plate from said driven member upon release of the clutch.

7. A clutch comprising rotatable driving and driven members adapted to be frictionally engaged and one of which defines an axially shiftable pressure plate; an annular back plate carried by said driving member; clutch engaging levers fulcrumed on said back plate for exerting force against said pressure plate to axially shift said pressure plate into clutch engaging position; spring seating means on said levers and back plate; coiled springs received in said seating means to act on said levers to pack said pressure plate and said driving and driven members; and elongate U-shape yieldable elements having their end arms carried by the peripheral region of said back plate, the elongate intermediate regions of said yieldable elements being connected to said end arms by portions of said elements overlying the outer peripheral edge of said back plate, and said intermediate regions being detachably latched to adjacent portions of said pressure plate by a snap action, said elements being effective to withdraw said pressure plate from said driven member upon compression of said coiled springs.

8. A clutch as defined in claim 7 and including lugs of hook-shape at the outer periphery of the pressure plate and pointing axially away from the back plate to receive the intermediate regions of the yieldable elements.

9. A clutch comprising driving and driven clutch members; an axially shiftable pressure plate cooperating with said members and having a radial lug of hook-shape; spring means applying axial force on said pressure plate to effect engagement of said clutch members; means for releasing said spring means to disengage said members; a support carried by said driving member rearward of said pressure plate and having spaced apertures in an outer annular region; and means defining a spring latch between said pressure plate and said support comprising a circumferentially extending elongate U-shape element the lateral end portions of which extend across the rim of said support, and reversely bent fingers on said end portions inserted into said support apertures to connect said element to said support, said element having a yieldable region intermediate its lateral portions arranged on a chordal line with respect to said support and having detachable engagement with said pressure plate lug and adapted to axially withdraw said pressure plate from said clutch members upon release of said force applying means.

10. A clutch assembly comprising driving and driven clutch members; an axially shiftable annular pressure plate cooperating with said members and having radially extending lugs of hook-shape on its outer periphery; a support carried by said driving member rearward of said pressure plate; levers fulcrumed on said support for acting on said pressure plate to engage the clutch members; spring means between said support and said levers for applying force thereon to shift said pressure plate into clutch engaging position; U-shape elements having elongate resilient connecting regions arranged chordally to the outer periphery of the pressure plate with the mid portions of said connecting regions yieldably engaged by a snap-action with said hook-shape lugs; the arms of said U-shape elements extending laterally across the rim of said support; and reversely bent fingers at the ends of said arms inserted into apertures in peripheral regions of said support to connect said elements thereto; said elements providing readily releasable driving connections between said pressure plate and said support and being adapted to withdraw said pressure plate axially away from said clutch members upon release of said force applying spring means.

11. A clutch assembly as defined in claim 10 wherein the support is provided with elongate peripheral recesses through which the hook-shaped radial lugs of the pressure plate protrude, and the resilient connecting regions of the U-shaped elements extend in chordal lines across said recesses.

12. A clutch comprising drive and driven members adapted for frictional engagement; an axially shiftable pressure plate rotatable with said drive member; a clutch back member rotatable with said drive member and having an aperture therein; a radial lever extending through said back member aperture, the foot region of said lever lying within said back member and being effective to axially shift said pressure plate into clutch engaged position; the radially inner region of said lever having an aperture therein adjacent said back member aperture; a clutch packing spring fulcrumed at its ends respectively against the angular edges defining said apertures in said lever and back member; and means transmitting force from the lever foot region to said pressure plate.

13. In a clutch, an axially shiftable pressure plate; a rotatable clutch back member having driving connection with said pressure plate and having apertures therein; radial levers extending through said back member apertures, the foot regions of said levers lying within said back member and being effective to axially shift said pressure plate into clutch engaged position; the radially inner portions of said levers having apertures therein adjacent the respective back member apertures; coiled clutch packing springs fulcrumed at their ends respectively against the angular edges defining said apertures in said levers and back member; and struts between said foot regions of the levers and said pressure plate for transmitting the torsion of said springs to said pressure plate for effecting engagement of the clutch.

14. A clutch comprising driving and driven members adapted to be frictionally engaged; an axially shiftable pressure plate for effecting said frictional engagement of said members; a clutch cover drivingly connected to said pressure plate and anchored to said driving member, said cover having an aperture radially outward from its axis; a radial lever extending through said aperture and fulcrumed on said cover adjacent an edge of said aperture, the radially outer region of said lever being adapted to exert force against said pressure plate to effect clutch engagement; the body portion of said lever which is outside said cover having an aperture therein; and a coiled spring packed between said cover and said lever body portion for urging said lever in a direction to effect clutch engagement, the terminal convolutions at the ends of said spring being flat and fulcrumed on angular edges of the respective apertures in said cover and lever.

15. A clutch comprising driving and driven members adapted to be frictionally engaged; an axially shiftable pressure plate for effecting said frictional engagement of said members; a clutch cover drivingly connected to said pressure plate and anchored to said driving member, said cover having an aperture radially outward from its axis; a radial lever extending through said aperture and fulcrumed on said cover adjacent an edge of said aperture, the radially outer region of said lever being adapted to exert force against said pressure plate to effect clutch engagement; the body portion of said lever which is outside said cover having an aperture therein; a coiled spring packed between said cover and said lever body portion for urging said lever in a direction to effect clutch engagement, the terminal convolutions at the ends of said spring being flat and fulcrumed on angular edges of the respective apertures in said cover and lever; lugs on said cover adjacent the aperture therein and extending into the proximate region of said spring; and lugs on said lever body portion adjacent the aperture therein and extending into the proximate region of said spring, said cover lugs and said lever lugs assisting in retaining said spring in position.

16. A clutch comprising driving and driven members adapted to be frictionally engaged; an axially shiftable pressure plate for effecting said frictional engagement of said members; a clutch cover drivingly connected to said pressure plate and anchored to said driving member, said cover having an aperture radially outward from its axis; an out-turned lug projecting from an edge of said aperture; a radial lever extending through said cover aperture and fulcrumed on said cover adjacent an edge of said aperture, the radially outer region of said lever exerting force against said pressure plate to effect clutch engagement; the body portion of said lever which is outside said cover having an aperture therein; an in-turned lug on the lever body portion adjacent said lever aperture; and a coiled spring packed between said cover and said lever body portion for urging said lever in a direction to effect clutch engagement; the terminal convolutions at the ends of said spring being flat and fulcrumed on angular edges of the respective apertures in said cover and lever in surrounding relation to the respective lugs.

References Cited in the file of this patent
UNITED STATES PATENTS

| 1,919,523 | Mayer | July 25, 1933 |
| 1,921,315 | Hughes | Aug. 8, 1933 |
| 1,942,691 | Fink | Jan. 9, 1934 |
| 1,985,301 | Thelander et al. | Dec. 25, 1934 |
| 2,100,464 | Almen et al. | Nov. 30, 1937 |
| 2,195,664 | Wolfram | Apr. 2, 1940 |
| 2,325,193 | Nutt et al. | July 27, 1943 |
| 2,453,344 | Root | Nov. 9, 1948 |
| 2,589,308 | Thelander | Mar. 18, 1952 |

FOREIGN PATENTS

| 419,834 | Great Britain | Nov. 30, 1934 |